United States Patent Office 3,536,661
Patented Oct. 27, 1970

3,536,661
STABILIZATION OF POLYOLEFINS AND NOVEL STABILIZER COMPOUNDS
Hugh John Hagemeyer, Jr., and Alfred Green Robinson III, Longview, Tex., assignors to Eastman Kodak Company, Rochester, N.Y., a corporation of New Jersey
No Drawing. Filed July 3, 1967, Ser. No. 650,657
Int. Cl. C08f 45/58
U.S. Cl. 260—45.85
5 Claims

ABSTRACT OF THE DISCLOSURE

This invention relates to the stabilization of polyolefins such as polyethylene and polypropylene against weathering, including causes such as ultraviolet radiation, heat and oxygen, and other causes of deterioration by means of certain compounds containing, in a single molecule, a 1,2-carbonyl phenolic group

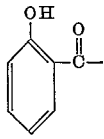

a sulfur containing group of the configuration

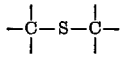

and in some cases an additional substituted or unsubstituted phenolic group, and other groups. The polyolefin plastics are polymers of mono-α-olefins or copolymers thereof with other unsaturated monomers.

The novel polyolefin compositions contain a compound of the formula

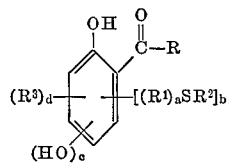

wherein:
  $a$, $b$, and $c$ are cardinal numbers of from 0 to 1;
  $d$ is a cardinal number of from 0 to 2, the sum of $b$, $c$, and $d$ being a cardinal number of from 0 to 3;
  R, $R^1$, $R^2$, and $R^3$ are polyolefin-compatible organic radicals, at least one of R, $R^2$, and $R^3$ containing an aromatic radical;
    and when $b$ is 0, R is —$R^4SR^5$, $R^4$ being a hydrocarbylene radical and $R^5$ being a polyolefin-compatible organic radical.

The foregoing formula encompasses compounds known per se, but not as stabilizers which protect polyolefins against both oxidation and ultraviolet radiation, as well as a subgenus of novel compounds having the same newly found utility and having the formula

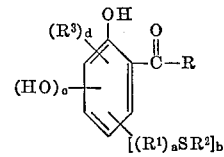

wherein:
  $a$, $b$, and $c$ are cardinal numbers of from 0 to 1;
  $d$ is a cardinal number of from 0 to 2, the sum of $b$, $c$, and $d$ being from 0 to 3;
  R, $R^1$, $R^2$, and $R^3$ are organic radicals compatible with said organic material;
    when $a$ and $b$ are 1, R is aryl alkyl or hydroxyaryl;
    when $a$ is 0 and $b$ is 1, $R^2$ is hydroxyaryl;
    and when $b$ is 0, R is —$R^4SR^5$, $R^4$ being alkylene or arylene, and $R^5$ being an organic radical compatible with said organic material.

The following classes of compounds fall with the latter formula

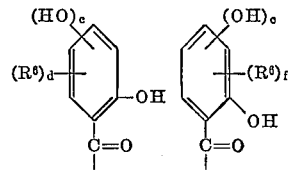

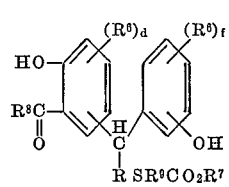

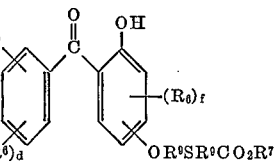

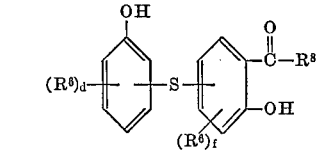

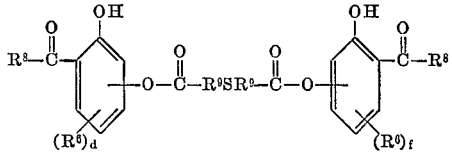

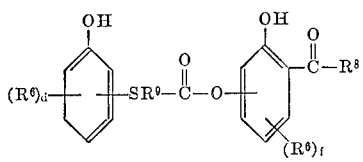

In the immediately foregoing formulae, $c$ and $d$ have the meaning given heretofore, $f$ is a cardinal number of from 0 to 1, $R^6$ is suitably a hydrocarbyl, acyl, or aroyl radical, $R^7$ is suitably a hydrocarbyl radical, $R^8$ is suitably a hydrocarbyl, alkoxy, aroxy, acyl or aroyl radical, and $R^9$ is suitably an alkylene radical. Examples of hydrocarbyl radicals are ethyl, phenyl, vinyl, and cyclooctyl. Representative acyl and aoryl groups are propionyl, stearyl, and benzoyl. Useful alkoxy and aroxy radicals are represented by ethoxy and phenoxy. The alkylene radical is represented by ($-C_nH_{2n}-$) such as ethylene ($-C_2H_4-$) and dodecylene ($-C_{12}H_{24}-$).

Other suitable radicals are disclosed below. Specific novel compounds are discussed in the examples.

BACKGROUND OF THE INVENTION

The problems encountered, prior art of interest, unexpected results, and the solution to problems encountered by the present invention are discussed below.

The stabilizing and preservation agents useful in accordance with the invention prevent or minimize changes in the polymers caused or induced by one or more environmental factors such as climate and abnormal temperatures, visible and invisible wave energy, exposure to or the presence of deterioration-inducing or reactive materials and solvents for the compounded polymer or components thereof, and biological attack. Such changes fall within a number of areas. Thus, changes in flexural and tensile properties, strength properties in general, and the integrity of plastic bodies present a common problem. Changes in macromolecular structure and composition as well as changes in homogeneity of the compounded or raw polymer are also encountered. Appearance is not the least of the properties which may change, and this area includes color and surface characteristics, such as fading, crazing, cracking, and changes in hardness, such as embrittlement and softening.

"Weathering" is inclusive of many alterations which may take place, since exposure to the elements and air or polluted air involves temperature changes, exposure to moisture and biological attack, exposure to wave energy such as sunlight and ultraviolet light, contact with reactive materials in air such as sulfur oxides and other sulfur compounds, peroxides, oxygen, and ozone, and dissolution, leaching or exudation of compounding ingredients. As used herein, the term "weathering" is intended to denote exposure to such conditions which may result in such changes. One form of weathering is photochemical degradation of polymers when exposed to ultraviolet light, such as sunlight, and air, which appears to be a photooxidation process causing rupture of the polymer chain, formation of carbonyl ($=C=O$) groups, or other changes. As this degradation progresses, the articles manufactured from these polymers, particularly those having thin cross sections, such as fibers and film, tend to crack, become brittle and lose tensile strength to the extent of mechanical failure.

Some changes may arise from polymer structure and impurities therein. Thus, unsaturation in the polymer and branching of the polymer provides potential sites for changes, such as crosslinking, depolymerization, or other changes, and impurities such as traces of metals or compounds thereof from catalyst residues and equipment corrosion may catalyze or otherwise induce alteration of the polymer.

Conditions inducing heat and oxygen degradation may be encountered in the utilization of the product in areas such as electrical insulation and during manufacturing processes utilizing the polymer. Thus, in milling, melt extruding, and in procedures such as compression molding, rolling, pressure deforming, calendering, or compounding of the polymer, high temperatures and exposure to air are commonly encountered and may result in heat and oxygen degradation of the polymer.

It is common knowledge in the art that stabilizers known to be useful for one material, polymer or plastic may or may not be useful in another environment, that is, for another material, polymer or plastic. Thus, stabilizers for a synthetic rubber are not presumed to be stabilizers for other polymers in the absence of extensive experimentation. Similarly, compounds which may be added to a given polymer and which confer stabilization against the deteriorative effect of ultraviolet light may have little or no effect in inhibiting thermal oxidation. The converse is true in that compounds which are excellent inhibitors of thermal oxidation may be of little or no benefit in stabilizing against deterioration by ultraviolet light.

The stabilizers must not only be effective, but also must have certain other properties. For instance, they must be compatible with the polymer and compounding ingredients in effective amounts, and they are preferably non-migratory, or do not result in blooming or exudation. They of course must resist weathering. They should be colorless or aesthetically pleasing, have a stable color when subjected to heat or light, and if colored, should be non-fading. Of further importance is that the additive compounds should be non-destructive of, or should enhance, desirable polymer properties such as electrical properties, adhesiveness or non-adhesiveness, and so forth. Toxicity and odor or lack thereof are desirable depending upon utility, e.g., in products subject to biological attack or subject to insect or rodent damage, or products which come into contact with comestibles or living tissue.

In the past, it has been common to blend certain additives with the polyolefin to stabilize the polyolefin to the effects of heat. Similarly, certain additives are blended with polyolefins, particularly polypropylene, to obtain improved light stabilization. Derivatives of 2,4-dihydroxy-benzophenone are a common class of compounds used to stabilize polypropylene against light-initiated processes. Phenols, sulfur-containing compounds, and amines are commonly used as antioxidants. Their purpose is to give improved thermal stability to the polyolefin and to suppress all oxidative processes taking place in the polyolefin, however initiated. In current practice, a combination of the above classes of compounds is used to provide improved oxidative stability. It is well known in the art that certain combinations of stabilizers provide more protection than the sum of the stabilizing actions of the components used separately. This effect is the well known synergistic effect. A common example of synergistic polyolefin stabilizer systems is the use of certain phenols with certain sulfur-containing compounds to obtain improved stability.

The typical polyolefin, especially stereosymmetric polyolefins such as crystalline polypropylene, are currently stabilized using at least three separate components. A typical stabilization system for polypropylene is given below.

| Compound: | Functional group class |
|---|---|
| 2,6-di-t-butyl-p-cresol | Phenol. |
| Dilauryl Thiodipropionate | Sulfur. |
| 2,4-dihydroxybenzophenone | 1,2-carbonyl phenol. |

The present use of these multi-component systems has several disadvantages. These include, first, the necessity of having to inventory and maintain quality controls on a variety of different stabilizers; and, more importantly, homogeneous blending of three or more separate components into polyolefins is difficult to achieve. The effectiveness of multi-component systems in polyolefins depends on homogeneous blending of the separate components to give polyolefin compositions containing certain ratios of the separate components. For example, to obtain the desired synergistic effect of phenol-sulfide combinations, the ratio of the two separate stabilizers incorporated into the polyolefin must be closely controlled. Finally, the use of three or more separate stabilizers can lead to undesirable side reactions causing undesirable polyolefin properties such as inferior color and odor. All of these factors result in undesirably erratic stabilization performance of different production batches of polyolefins.

It has now been discovered that the use of single compounds containing all the functional groups necessary for polyolefin stabilization eliminates all or most of the disadvantages of multi-component systems enumerated above. It was truly an unexpected result when it was found that the synergism observed for particular blends of antioxidants was surpassed by the functional stabilizers. In addition, the novel concepts of the present invention have resulted in polyolefin stabilizers possessing other advantages.

The resulting stabilizer is a single compound which when added to a polyolefin provides stabilization against both heat-initiated and light-initiated oxidation. In addition, the presence of sulfur and a phenol group provides an improved synergistic stabilization effect, the synergism being between the various groups in a single compound. The stabilizers of the present invention are more easily and homogeneously blended into polyolefins than conventional multi-component systems. This property eliminates the erratic results obtained from use of multi-component systems. The use of the stabilizers of the present invention, on a comparable weight basis to the use of a plurality of compounds results in superior polyolefin stabilization, and consequently lower levels of stabilizer in the polyolefin can be used to achieve an adequate level of stabilization. The use of lower stabilizer concentrations results in improved polyolefin color and odor.

The stabilizers embodied in the present invention are prepared by methods well known to those skilled in the art. For example, polyhydroxy phenols can be esterified with sulfur-containing compounds, such as thiodipropionic acid, to give products containing the required phenol and sulfur groups. The resulting product may then be acylated under typical Friedel-Crafts conditions to create the 1,3-carbonyl phenol group within the compound.

Many compounds can be made that embody our invention, some typical examples being given below. In the formulae shown below, R may represent hydrogen, aryl, alkyl, acyl or aroyl groups, or alkoxy or aroxy groups.

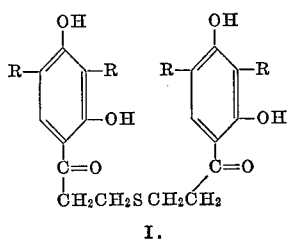
I.

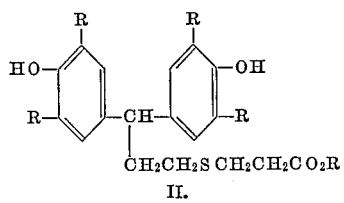
II.

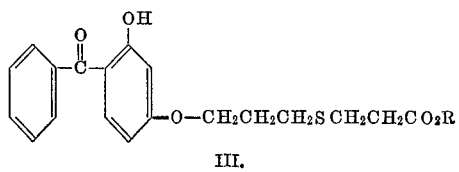
III.

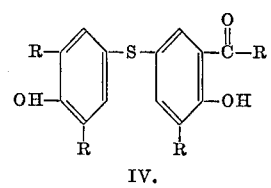
IV.

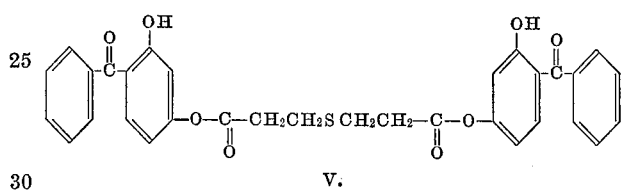
V.

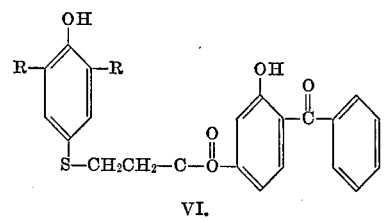
VI.

In Formula II, one or more of the radicals R is acyl or aroyl. Formula IV encompasses certain compounds known in the art, as well as novel compounds. (See U.S. Pat. Nos. 2,319,662 and 2,409,687, which are of interest to the compounds per se, and their manufacture.) The examples hereinbelow also illustrate methods by which these types of compounds may be prepared.

Specific compounds are described in the examples. The preservatives or stabilizers are blended with the polyolefin in any of the conventional ways.

One object of the present invention is the provision of stabilized organic materials, particularly plastics, in which one or more of the changes mentioned heretofore, but not necessarily all of such changes, are prevented or inhibited by the utilization of said stabilizing materials.

It is another object of this invention to provide new poly-α-olefin compositions having enhanced resistance to degradation by environmental conditions, particularly to degradation by ultraviolet light, weathering, and conditions encountered during manufacturing processes, and to provide stabilized articles and methods for their preparation.

Another object of the invention is to provide a polyolefin composition and particularly polypropylene, polyethylene, or copolymers thereof, having a high resistance to degradation by long term ultraviolet radiation, and to heat and oxygen damage, and articles formed thereof, having a stable appearance or color.

A further object of the invention is to provide novel stabilizer compounds useful for stabilizing one or more polyolefins against deterioration, particularly that connected with exposure to ultraviolet radiation, and with thermal oxidation.

In the generic and subgeneric formulae given above, the following, as well as the examples, illustrate suitable radicals R, $R^1$, $R^2$, $R^3$, $R^4$, $R^5$, $R^6$, $R^7$, $R^8$, and $R^9$, including poly-α-olefin-compatible ones.

| R, $R^3$, $R^6$, or $R^8$ | $R^2$ or $R^5$ | $R^1$, $R^4$, or $R^9$ |
|---|---|---|
|  | —CH$_2$CH$_2$$\overset{\text{O}}{\text{C}}$—O—C$_5$H$_{11}$ | —OCH$_2$CH$_2$— |
| 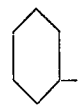 | 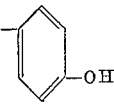 | —CH(C$_6$H$_4$OH)CH$_2$CH$_2$— |
| H$_3$C—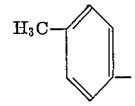 | —CH$_2$—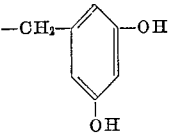 | —CH$_2$CH$_2$—$\overset{\text{O}}{\text{C}}$—O— |
| CH$_3$(CH$_2$)$_7$— | —CH$_2$CH$_2$—$\overset{\text{O}}{\text{C}}$—O—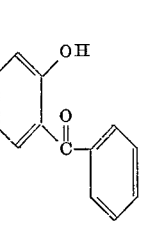 | —CH(CH$_3$C$_6$H$_4$OH)CH$_2$CH$_2$— |
| HO—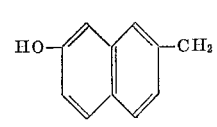—CH$_2$ | —CH$_2$CH$_2$—O—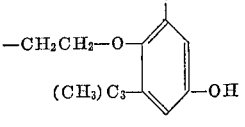 | —(CH$_2$)$_4$— |
| CH$_3$—$\overset{\text{O}}{\text{C}}$— | 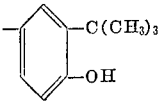 | 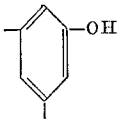 |
| (CH$_3$)$_3$C— | 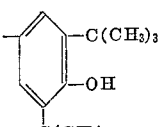 | —CH$_2$—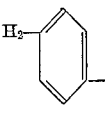 |
| CH$_3$—CH$_2$—O— | —CH$_2$—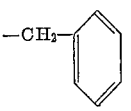 | |
| 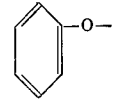 | | |
| 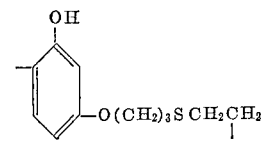 | | |

The radical $R^7$ is preferably a hydrocarbyl radical, examples being methyl, butyl, dodecyl, phenyl, benzyl, tolyl, vinyl, cyclohexyl, cyclooctyl and the like. Additional examples of $R^3$ and $R^6$ are acyl radicals such as acetyl, dodecanoyl, isobutyryl, and stearoyl, as well as aroyl radicals such as benzoyl, salicycoyl, phenylacetyl, and toluoyl.

The radicals $R^1$ through $R^9$ inclusive preferably have from 1 to about 20 carbon atoms. Polyolefin-compatible organic radicals are those which, as part of the stabilizer compound, permit effective amounts of the stabilizer to be blended with the polyolefin, a property readily determined by the ordinary worker in the art. Other methods of synthesis of these novel stabilizers will occur to those skilled in the art. Illustrative detailed syntheses are described in the examples given below. The resulting stabilizers of this invention may be incorporated into polyolefin resins by blending using conventional milling or other mixing means. The stabilizers of the present invention may also be mixed with the polyolefin in the form of molding powder and incorporated during extrusion or during injection molding. Alternatively, the present stabilizers can be added to a solution or suspension of the polyolefin in an organic solvent as the particular mixing procedure warrants. The compounds of the present invention are effective when used in amounts of from 0.01 to 10 percent, preferably from 0.05 to 3 percent, based on the weight of polyolefin.

The novel stabilizers of the invention have wide utility. They are useful in stabilizing plastics, natural and synthetic elastomers, pressure sensitive adhesives, unsaturated monomers, and the like. Among the useful polymers, plastics and elastomers are natural and synthetic resins and rubbers, including poly-α-monoolefins, poly-1,3-diolefins, polyesters, cellulose esters, "Spandex" elastomers, and others.

It will be understood that in some instances the polymer, preferably polypropylene or polyethylene, is modified by blending with other polymers in smaller amounts and the invention includes such blends. The polymers include any of the commercially available materials such as the low density and high density polyolefins, the so-called amorphorus and crystalline polyolefins, and the polyolefins designated by the terminology isotactic and atactic. Polyolefins having a density of between about .9 and 1.0 are suitable, including low density products having a density of about .9–.93, medium density products having a density of about .95–.97. Preferably the polyolefin is prepared by one of the well-known high pressure or low pressure processes and has a high degree of crystallinity, that is, low heptane solubility. High density poly-α-olefins generally have a crystallinity of at least 85% and more usually at least 90% as determined by X-ray diffraction. Reference is made to Fawcett et al. U.S. Pat. 2,153,553, granted Apr. 11, 1935, to Belgian Pat. 538,789, to Scientific American, September, 1957 at page 98, to Cash U.S. Pat. No. 2,912,424 and Hagemeyer U.S. Pat. No. 2,917,500 for suitable polyolefins and methods for their preparation.

The molecular weight of the polyolefin is normally above about 9,000, and preferably above 20,000 and up to 300,000 or more, although the stabilizers of the invention may be used to stabilize the poly-α-olefin "waxes" having lower average molecular weights of usually 3,000 to 13,000. Preferably it is such that the melt index is above 0.1 for the reason that a product having a lower melt index is difficult to fabricate into useful products without degradation of the polymer. In general, any of the polymers of α-monoolefins having from 2 to about 20 carbon atoms is useful in accordance with the invention. Such other poly-α-olefins include normally solid homopolymers and copolymers of isobutylene, pentene-1,2,-methylbutene-1, 3-methylbutene-1, hexene-1, heptene-1, octene-1, nonene-1, decene-1, 4-methyl-heptene-1, 6-ethylheptene-1, octadecene-1, styrene, butadiene, isoprene, allylbenzene and the like, and copolymers of or with ethylene and/or propylene.

In addition to the foregoing copolymers and homopolymers, the practice of this invention includes the preparation and treatment of crystalline block copolymers such as propylene with ethylene, or with butene-1, 1,1,4,4-tetramethyl-1,3-butadiene, isoprene, styrene, or vinyl chloride; 4-methylpentene-1 with butene-1; propylene with butene-1; ethylene with hexene-1; and propylene with $C_9$–$C_{11}$ α-olefins. In these crystalline or stereoregular block polymers, that are synthesized with two or more olefins, the individual segments exhibit degrees of crystallinity or stereoregularity normally associated with the α-olefin homopolymers, only.

Such crystalline block copolymers are those, for example, prepared from propylene and ethylene by block formation techniques employing such catalysts as lithium aluminum hydride $TiCl_3$ and $BF_3$ in the high temperature solution process, or ethyl aluminum sesquichloride, hexamethyl phosphoramide and $TiCl_3$ in the low temperature slurry process.

Since these crystalline block copolymers are relatively new to the art the following examples are included to illustrate the formation of such crystalline copolymers.

(A) Propylene-ethylene crystalline copolymer may be prepared by polymerization in a continuous 2-stage reactor system. In the first stirred tubular reactor the feed is liquid propylene and the catalyst is ethyl aluminum sesquichloride, hexamethyl phosphoramide and titanium trichloride in a 2⅓ molar ratio. The catalyst, suspended in xylene, is fed to the liquid propylene and the polymerization is carried out at about 89° C. and about 770 p.s.i.g. using about 100 p.p.m. $H_2$ to control inherent viscosity. Conversion in the first stage averages 25–30 percent at a catalyst concentration of about 0.2 percent.

The polymer slurry from the first stage is fed to the second stage tubular reactor, 4 weight percent ethylene is added, and the polymerization continued at 80° C. and 860 p.s.i.g.

From the second stage the polymer slurry in liquid propylene is let down to a solids-gas separator. The olefins are flashed off and the polymer dropped to a wash tank. Catalyst removal is effected with hot isobutanol washing.

The propylene-ethylene copolymer containing 97 percent, by weight, of polymerized propylene and 3 percent, weight, of polymerized ethylene in a yield per unit of catalyst of 250 is obtained. The inherent viscosity of the propylene-ethylene copolymer is 2.2, the brittleness temperature is −28° C. and the infrared spectrum shows absorption maxima at 9.6 and 13.9 microns.

(B) 0.60 grams of $LiAlH_4$ (.0158 mole) and 2.46 grams of $TiCl_3$ (.0158 mole) slurried in 900 ml. of mineral spirits is charged to a 2-liter stirred autoclave. The polymerization is carried out as follows:

| Time: | Pressure | Temp.,° C. |
|---|---|---|
| 3:50 | 800 p.s.i.g. $C_3H_6$ | 133 |
| 4:05 | 1,775 | 161 |
| 4:18 | 1,050 | 164 |
| 4:25 | 900 | 159 |
| 4:50 | 600 | |
| 4:52 | Pressured to 850 p.s.i.g. with $C_2H_4$ | 155 |
| 5:30 | 515 | 154 |
| 0:00 | 185 | 151 |

The autoclave is cooled and the polymer washed free of catalyst with hot isobutanol to yield 320 grams of gross polymer containing 85 percent copolymer containing 95 percent by weight of polymerized propylene and 5 percent by weight of polymerized ethylene. The gross polymer exhibits a melt index of 3.6, and inherent viscosity at 145° C. in tetralin of 1.36, a Vicat softening point of 131° C. and a brittleness temperature of −50° C.

Upon extraction with boiling hexane 15 percent of the gross polymer is removed and the crystalline copolymer is obtained. This copolymer has an inherent viscosity at 145° C. in tetralin of 1.55, a Vicat softening point of 139° C., a brittleness temperature of −38° C. and a characteristic infrared absorption maxima at 9.6 and 13.9 microns.

(C) 0.75 grams of LiAlH$_4$ (.02 mole) and 3.06 grams of TiCl$_3$ (.02 mole) in 900 ml. of mineral spirits is charged to a 2-liter stirred autoclave. The polymerization is carried out as follows:

| Time: | Pressure | Temp., ° C. |
|---|---|---|
| 2:45 | 800 p.s.i.g. C$_3$H$_6$ | 132 |
| 2:55 | 1,700 | 150 |
| 3:35 | 550 | 15 |
|  | Pressured to 800 p.s.i.g. with butene-1 | 167 |
| 3:45 | 500 | 170 |
| 4:10 | 410 | 165 |
| 4:30 | 375 | 160 |

The autoclave is discharged through a filter yielding 400 grams of gross polymer containing a propylene-butene-1-copolymer containing 96 percent, by weight, polymerized propylene and 4 percent, by weight, of polymerized butene-1. The gross polymer has a brittleness temperature of −35° C. Extraction with refluxing hexane for 10 hours removes 10 percent of the gross polymer leaving the crystalline propylene-butene-1 copolymer which exhibits a brittleness temperature of −21° C. and all infrared absorption maxima at 9.6 and 13.1 microns.

Further, in regard to such crystalline copolymers, the preferred ones comprise chains which consist essentially of polymerized propylene segments chemically joined to segments of polymerized a-monoolefinic hydrocarbon other than propylene wherein the copolymer has an inherent viscosity in tetralin at 145° C. of from about 0.4 to 2.4, a density of at least about 0.85, a brittle point below 0° C. and containing at least 80% by weight of polymerized propylene, and preferably at least about 93% by weight of polymerized propylene. It is also noted that the hexane extractable portions of the gross polymer of the above processes are also useful in practicing the present invention.

Similar crystalline block copolymers of poly-a-olefins as disclosed in Belgian Pats. 624,652 and 624,653 (H. J. Hagemeyer, Jr. and M. B. Edwards) are useful. Therein, these polymers are referred to as "polyallomers."

Although the composition of the present invention will provide the necessary stabilization, small amounts of other materials can also be added to the polyolefin. Such materials include fillers, resins, plasticizers, pigments, dyes, antistatic agents or other stabilizers to modify the composition for a particular application.

The following examples more fully illustrate the nature of the present invention; however, the specific details of these examples are not to be construed as limitations upon the scope of our invention.

EXAMPLE 1

To a stirred mixture, consisting of 214 g. (one mole) of 2,4-dihydroxybenzophenone, 1500 ml. of toluene and 125 ml. of pyridine, over a 2-hour period, 107.5 g. (0.5 mole) of thiodipropionyl dichloride was added dropwise. The mixture was stirred at 65° C. for 4 hours after the addition was complete. The reaction mixture was cooled and washed with water, with 5 percent aqueous sodium bicarbonate, with dilute hydrochloric acid and finally with water. The solvent was removed under reduced pressure to give 271 g. of a pale yellow wax. Infrared analysis showed that the product consisted of 83 percent of bis(3-hydroxy-4-benzoyl phenyl), 3,3'-thiodipropionate (compound XI, given below) and 17 percent of bis(5-hydroxy-2-benzoyl phenyl) 3,3'-thiodipropionate. Other analyses obtained were:

Saponification equivalent—Found, 146; theoretical 142.5. Percent sulfur—Found, 5.59; theoretical, 5.62.

The resulting diester of thiodipropionic acid was dissolved in acetone. Crystalline polypropylene having an inherent viscosity of 1.7 and a melting point of about 165° C. was thoroughly mixed with the acetone solution, after which the acetone was evaporated by heating in a vacuum oven at 70° C. for one hour. The polymer was then placed in an aluminum dish and subjected to heating at 185° C. in a forced draft oven. Samples were removed at periodic intervals and the color determined. Similar tests were also run on a conventional multicomponent stabilized polypropylene. The results are given in Table I.

TABLE I

Heat Stability at 185° C.

| Stabilizer | Percent concentration | Time, hrs. | | |
|---|---|---|---|---|
|  |  | 8 | 16 | 24 |
| Diester of thiodipropionic acid and 2,4-dihydroxybenzophenone | 0.2 | 1 | 2 | 3 | 4 |
| Dilauryl thiodipropionate | 0.3 |  |  |  |
| Plus |  |  |  |  |
| 4,4'-butylidene bis(6-t-butyl-m-cresol) | 0.1 | 2 | 4 | 6 |
| Plus |  |  |  |  |
| 2,4-dihydroxybenzophenone | 1.0 |  |  |  |

$^1$ Arbitrary color scale from 1 (white) to 8 (dark brown).

The same two stabilized polypropylene blends were placed in a weatherometer for 1000 hours to measure the comparative light stability. The results are given in Table II.

TABLE II

Light Stability—1,000-hr. Weatherometer

| Stabilizer | Percent concentration | Color $^1$ |
|---|---|---|
| Diester of thiodipropionic acid and 2,4-dihydroxybenzophenone | 0.2 | 4 |
| Dilauryl thiodipropionate | 0.3 |  |
| Plus |  |  |
| 4,4'-butylidene bis(6-t-butyl-m-cresol) | 0.1 | 7 |
| Plus |  |  |
| 2,4-dihydroxybenzophenone | 1.0 |  |

$^1$ Arbitrary color scale from 1 (white) to 8 (dark brown).

Example 2–Thiodipropionyl bis(4,4'-resorcinol)

A mixture consisting of 55 g. (0.5 mole) of resorcinol and 54 g. (0.25 mole) of thiodipropionyl dichloride was saturated with boron trifluoride and heated for 3 hours at 110° C. The mixture was cooled and added to 500 ml. of saturated aqueous sodium acetate solution. The organic layer was taken up in ether, the ether layer washed with aqueous sodium bicarbonate, then with water and dried. Ether was removed under reduced pressure to give a light yellow wax. The following analyses were performed:

Neutral equivalent—Found: 194, 819; theoretical: 187, 8.56.

The product, thiodipropionyl bis(4,4'-resorcinol), [bis(2", 4"-dihydroxy)-3,3'-thiodipropiophenone] which has the formula

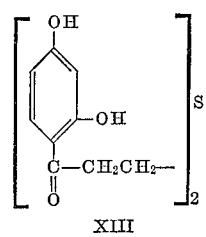

XIII

It was blended into polypropylene and tested as described in Example 1. The results are given in Tables III and IV.

TABLE III
HEAT STABILITY AT 185° C.

| Stabilizer | Percent concentration | Time, hrs. 8 | 16 | 24 |
|---|---|---|---|---|
| Thiodipropionyl Bis(4,4'-resorcinol) | 0.2 | [1]2 | 3 | 5 |
| Dilauryl thiodipropionate | 0.3 | | | |
| Plus 4,4'-butylidene bis(6-t-butyl-m-cresol) | 0.1 | 2 | 4 | 6 |
| Plus 2,4-dihydroxybenzophenone | 1.0 | | | |

[1] Arbitrary color scale 1 (white) to 8 (dark brown).

TABLE IV
LIGHT STABILITY—1,000-HR. WEATHEROMETER

| Stabilizer | Percent concentration | Color [1] |
|---|---|---|
| Thiodipropionyl bis(4,4'-resorcinol) | 0.2 | 4 |
| Dilauryl thiodipropionate | 0.3 | |
| Plus 4,4'-butylidene bis(6-t-butyl-m-cresol) | 0.1 | 7 |
| Plus 2,4-dihydroxybenzophenone | 1.0 | |

[1] Arbitrary color scale from 1 (white) to 8 (dark brown).

EXAMPLE 3

Prolypropylene was compounded with 0.3 percent by weight of dilauryl thiodipropionate, 0.1 percent by weight of 4,4'-butylidene bis(6-tert-butyl-m-cresol) and 1.0 percent by weight of 2,4-dihydroxybenzophenone on milling rolls. The crepe from the milling rolls was compression molded into a plate 1/16 inch thick and 0.25 gram specimens were cut from the plate. A number of these specimens were placed in a forced air oven and held at 160° C. At intervals a specimen was removed and its peroxide content determined as follows:

The 0.25 gram specimen, chopped into small pieces, was placed in a flask containing 20 milliliters of carbon tetrachloride. The flask was heated on a steam bath just below the boiling point for 25 minutes with frequent agitation. To the hot solution, 20 milliliters of a 60 percent glacial acetic acid—40 percent chloroform mixture was added. One ml. of a saturated aqueous potassium iodide solution was added, and the flask stoppered and agitated for two minutes in subdued light. Distilled water (100 milliliters) was added and the iodide titrated with 0.002 normal sodium thiosulfate using two milliliters of 1 percent starch solution as indicator. The flask was shaken vigorously in the vicinity of the end point. The peroxide content is reported as the milliequivalents of peroxide per kilogram of sample. Additional 0.25 gram specimens were withdrawn from the forced air oven periodically and peroxide determination made. The peroxide content of the specimens is plotted as ordinate versus the number of hours the specimen was held in the 160° oven as abcissa. The 160° C. oven life of the sample is taken as the time where the peroxide content begins to increase rapidly. This inflection point is the point where rapid autooxidation of the base resin commences and corresponds to a point just prior to the stage where the physical properties of the specimen begin to deteriorate. The oven life of the sample in question was found to be 260 hours.

Using the same procedure for compounding antioxidants and measuring oven life, the following antioxidants were tested. Results are given in Table V.

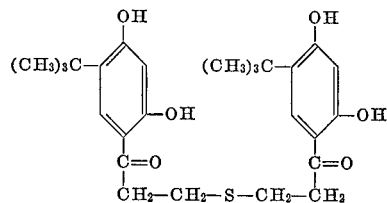

VII. Bis(2",4"-dihydroxy-5"-tert-butyl)-3,3'-thiodipropiophenone

VIII. Dodecyl 3-[propyl-3',3'-bis(3"-benzoyl-4"-hydroxyphenyl)thio]propionate

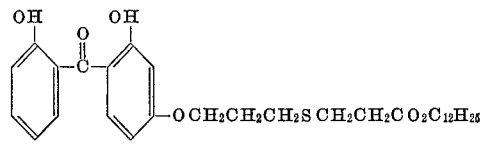

IX. Dodecyl 3-[propyl-3'-(4"-(2'"-hydroxybenzoyl)-3"-hydroxyphenoxy)-thio]propionate

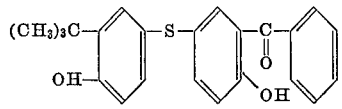

X. 2-hydroxy-5-(3'-tert-butyl-4'-hydroxyphenylthio)benzophenone

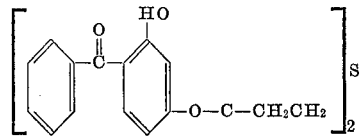

XI. Bis(4-benzoyl-3-hydroxyphenyl)3,3'-thiodipropionate

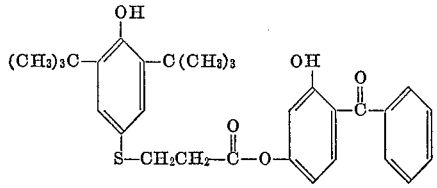

XII. 4-benzoyl-3-hydroxyphenyl 3(3',5'di-tert-butyl-4'-hydroxyphenylthio)propionate

TABLE V
Effectveness of antiozidants in polypropylene

| Antioxidant, percent: | Oven Life at 160° C., hrs. |
|---|---|
| None | 0.4 |
| 0.3 DLTDP [1]+0.1% SWP [2]+1.0% DHBP [3] | 260 |
| 0.3 VII [4] | 350 |
| 0.3 VIII | 320 |
| 0.3 IX | 490 |
| 0.3 X | 310 |
| 0.3 XI | 540 |
| 0.3 XII | 480 |

[1] DLTDP=Dilauryl thiodipropionate.
[2] SWP=4,4'-butylidene bis(6-tert-butyl-m-cresol).
[3] DHBP=2,4-dihydroxybenzophenone.
[4] See formulas shown above for specific structure.

Example 4

The same antioxidants shown in Table IV were tested as stablizers for a propylene-polyethylene crystalline (stereoregular) block copolymer containing 1.5 percent ethylene. Each composition was tested for oven life at 160° C. using the procedure described in Example 3. Results are given in Table VI.

TABLE VI
Effectiveness of antioxidants in propylene-ethylene crystalline block copolymer

| Antioxidant, percent: | Oven life at 160° C., hrs. |
|---|---|
| None | 0.3 |
| 0.3 DLTDP+0.1% SWP+1.0% DHBP | 270 |
| 0.3 VII | 360 |
| 0.3 VIII | 410 |
| 0.3 IX | 320 |
| 0.3 X | 410 |
| 0.3 XI | 560 |
| 0.3 XII | 510 |

Example 5

The compositions of Example 3 were molded into films about 60 mils thick. Strips cut from these films were exposed to outdoor weathering in Longview, Tex., at a 45° angle facing south. The development of brittleness in each strip was observed by periodically examining the strip and noting the time elapsed until it became brittle, the embrittlement point being the time elapsed until a strip breaks when bent double. Exposure data is given in Table VII.

TABLE VII

Effectiveness of stablizers in polypropylene weathering

| Stabilizer, percent: | Embrittlement time, hrs. |
|---|---|
| None | 152 |
| 0.3 DLTDP+0.1% SWP+1.0% DHBP | 725 |
| 0.3 VII | 795 |
| 0.3 VIII | 760 |
| 0.3 IX | 890 |
| 0.3 X | 760 |
| 0.3 XI | 1000 |
| 0.3 XII | 920 |

We claim:
1. A polyolefin composition selected from the class consisting of polyethylene, polypropylene and ethylene-propylene polymers stablized against deterioration by heat, light and oxidation, containing a stabilizing amount of an aromatic compound having the emperical formula wherein

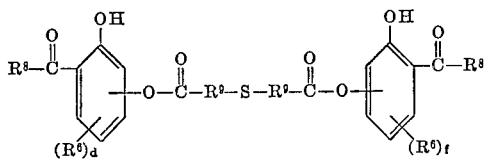

$d$ and $f$, independently are each cardinal numbers of from 0 to 2;
$R^9$ is alkylene of up to 20 carbon atoms;
$R^6$ is aryl of up to 18 carbon atoms, salicylol, phenylacetyl or toluoyl;
and $R^8$ is lower alkoxy, phenoxy, acyl of up to 18 carbon atoms or aryl up to 18 carbon atoms.

2. The polyolefin composition of claim 1 in which:
$d$ and $f$ are 0; and
$R^8$ is phenyl.

3. The polyolefin composition of claim 1 wherein from about 0.01 to about 10 percent of said aromatic compound based on the weight of the polyolefin, is added to said polyolefin composition.

4. The polyolefin composition of claim 1 wherein from about 0.05 to about 3 percent of said aromatic compound, based on the weight of the polyolefin, is added to said polyolefin composition.

5. A polyolefin composition selected from the class consisting of polyethylene, polypropylene and ethylene-propylene polymers stabilized against deterioration by heat, light or oxidation with a stabilizing amount of bis(4-benzoyl-3-hydroxyphenyl)3,3'-thiodipropionate.

References Cited
UNITED STATES PATENTS

| 3,227,677 | 1/1966 | Simpson | 260—45.85 |
| 3,277,148 | 10/1966 | Steinberg | 260—470 |
| 3,294,836 | 12/1966 | Peterson et al. | 260—479 |
| 3,380,962 | 4/1968 | Peterson et al. | 260—45.85 |
| 3,383,411 | 5/1968 | Schultz et al. | 260—470 |
| 3,422,059 | 1/1969 | Taylor et al. | 260—45.95 |

HOSEA E. TAYLOR, JR. Primary Examiner

U.S. Cl. X.R.

260—45.95, 470, 479, 590, 591